United States Patent Office 2,943,948
Patented July 5, 1960

2,943,948
SILICA COMPOSITION AND PRODUCTION THEREOF

Edward M. Allen, Doylestown, Ohio, assignor to Columbia-Southern Chemical Corporation, Allegheny County, Pa., a corporation of Delaware No Drawing. Filed June 24, 1959, Ser. No. 822,441

8 Claims. (Cl. 106—288)

This invention relates to a finely divided alumina-silica pigment which is useful as a reinforcing pigment in rubber compositions and also as a paper pigment, and to the paper thereby produced.

It is known that desirable rubber products may be prepared by incorporating certain silicates, such as finely divided, precipitated calcium silicate of the proper particle size, into the rubber, and vulcanizing the mixture. Such silicates act as reinforcing pigments which improve the strength and abrasive qualities of the rubber compound. Calcium silicate suitable for this purpose may be prepared by reacting a calcium salt, such as calcium chloride, with an alkali metal silicate, such as sodium silicate, in the manner as disclosed in the United States patent to Muskat and Gage, No. 2,287,700. One difficulty with such calcium silicate is that it does not disperse well in rubber. Consequently, the rubber reinforced with this material often is observed to have white specks of undispersed pigment. This makes the product unsightly.

Attempts to produce an aluminum silicate with desirable pigment properties by reacting an aluminum salt with sodium silicate are more difficult since the aluminum silicate thus precipitated and dried is in the form of a glassy substance. Even when ground up or crushed by usual methods, the product thus obtained is made up of large agglomerate masses which are too coarse and too hard to permit satisfactory use in a rubber compound.

In accordance with this invention, finely divided, white alumina-silica pigment compositions have been prepared, all of which have an average ultimate particle size below 0.5 micron, normally below 0.1 micron. As explained in greater detail below, pigments which are especially valuable in rubber have an average ultimate particle size of 0.01 to 0.05 micron. On the other hand, pigments for paper should be somewhat coarser, usually 0.05 to 0.2 micron or 0.25 micron. This pigment also contains at least 6 moles of $SiO_2$ per mole of $Al_2O_3$. The pigment may be contaminated with portions of calcium sulphate or other alkaline earth metal salt. However, such salt may be substantially absent, if desired. The alumina-silica pigment herein described may be used effectively as a reinforcing pigment in rubber and as an opacifying pigment in paper.

The pigment herein contemplated may be prepared by several methods. According to one such method, a water soluble aluminum salt, such as aluminum chloride, is reacted in aqueous medium with a finely divided, precipitated silicate of a metal of group II, series 3 to 8 of the periodic table of elements, such as calcium silicate, having an average ultimate particle size below about one micron, preferably below 0.1 micron.

The composition of the product thus obtained depends upon the nature of the aluminum salt used and also upon the relative proportion of the salt to the calcium silicate or like alkaline earth metal silicate. Where the anion of the aluminum salt forms a water soluble salt with the alkaline earth metal, the calcium or like metal is solubilized in substantially stoichiometric proportions to the aluminum salt added. Thus, where aluminum chloride is used, the reaction proceeds according to the equation:

$$3CaOx(SiO_2) + 2AlCl_3 \rightarrow Al_2O_3 3x(SiO_2) + 3CaCl_2$$

where $x$ denotes the initial molecular ratio of $SiO_2$ to CaO in the calcium silicate treated.

Normally, the amount of aluminum salt used should be enough to react with substantially all of the calcium silicate or like alkaline earth metal silicate. Thus, the product is largely or preponderantly the alumina-silica composition $Al_2O_3(SiO_2)_y$, where $y$ is substantially three times the ratio of moles of $SiO_2$ to moles of metal (for example, calcium), in the silicate subjected to treatment. Thus, a pigment is produced in which the mole ratio of $SiO_2$ to $Al_2O_3$ ranges from about 6 to about 40; the molecular ratio of $SiO_2$ to all metal oxides being in excess of 2, preferably above 3, and the mole ratio of $Al_2O_3$ to the sum of all other metal oxides being above 0.2.

Aluminum salts which will extract calcium and which may thus be used include aluminum chloride, aluminum bromide, aluminum nitrate, aluminum acetate, and the like. Magnesium can be extracted by aluminum sulphate.

According to a further embodiment of the invention, the calcium silicate or like silicate is reacted with an aluminum salt which has an anion which forms a water insoluble salt of the alkaline earth metal, i.e., salts having a solubility below about 2 or 3 grams per liter. In such a case, a mixed pigment containing the alumina-silica pigment described above and the alkaline earth metal salt is produced.

A typical salt of this type is aluminum sulphate. When such a salt is used, the mixture comprises calcium sulphate and the alumina-silica pigment. Where the reaction mixture is relatively dilute, some calcium or even all may be extracted from the pigment due to the fact that calcium sulphate has a small solubility in water. Thus, the alumina-silica pigment may be in an essentially pure state or in admixture with an alkaline earth metal salt such as calcium sulphate. Such salts can be extracted with water.

Since the alumina-silica pigment adsorbs ions, it frequently has adsorbed therein, or in combination therewith, alkali metal or alkaline earth metal ions in amounts which may be greater in mole proportion than $Al_2O_3$. However, the mole ratio of $Al_2O_3$ to the sum of all other oxides therein is above 0.2, and the mole ratio of $SiO_2$ to all metal oxides is above 2, preferably above 3.

When an amount of aluminum salt less than that required to decompose all of the calcium silicate is used, the product contains a very appreciable concentration of calcium, and the amount of CaO therein may be as high or even higher than the $Al_2O_3$ on a molecular basis.

While the pigment herein contemplated can be produced effectively using aluminum chloride or aluminum sulphate, other typical water soluble aluminum compounds such as aluminum nitrate, aluminum acetate, aluminum bromide or aluminum lactate, may be used.

The particle size of the aluminum silicate is important. For most uses, this material should have an average ultimate particle size less than one micron, and preferably not substantially in excess of 0.1 micron. Such particles usually are present as flocs or loosely bound aggregates which can be broken up on milling with rubber.

The exact particle size found desirable depends upon the use to which the pigment is to be put. For rubber uses and maximum reinforcing properties, the pigment should have an average ultimate particle size of 0.01 to 0.05 micron, the best pigments having an average ultimate particle size below 0.04 micron. Such pigments may be in the form of flocs of ultimate particles, some of the flocs being quite large, the preponderant weight of which are in the range of one to fifty microns. The presence of the large flocs normally is not disadvantageous because they are broken up during the milling operation.

The requirements of a good paper pigment are quite different. In such a case, the ultimate particle size should be above 0.05 micron, preferably in the range of about 0.2 micron.

The size of the resulting product is determined to a material degree by the particle size of the calcium silicate being treated. That is, the particle size of the pigment herein contemplated usually approximates the particle of the calcium silicate from which it is produced. To obtain a pigment having the best pigment rubber reinforcing properties, the aluminum salt should be reacted with an alkaline-earth metal silicate having an average ultimate particle size below about 0.1 micron (between 0.01 to 0.05 micron) as determined by an electron microscope. For best results in paper, a larger calcium silicate ranging above 0.05 micron in ultimate particle size is used.

Precipitation of calcium or other alkaline earth metal silicate in finely divided state, such as is herein required for good rubber reinforcement, may be accomplished by mixing a stream of aqueous calcium chloride (or other chloride of an alkaline earth metal) solution with a stream of aqueous sodium silicate solution under conditions which subject the mixture to a high degree of turbulence and almost instantaneous mixing. The amount of reactants in the respective streams is proportioned so as to obtain calcium silicate in the desired concentration and to establish an excess of calcium chloride over the stoichiometric quantity required to react with the silicate. One effective way to produce the required turbulence is to introduce the two streams closely together into a central area of a centrifugal pump. In this case, the agitation of the mixture is effected as the introduced streams of reactants are thrown radially outward by the pump rotor.

In most cases, it is found desirable to limit the feed of calcium chloride and alkali metal silicate solutions entering the pump to an amount below the capacity of the pump. For example, if the pump is capable of discharging 100 gallons per minute, then the amount of reacting solutions applied to the pump is held to at least 100 percent below, and usually to 35 percent or more below, this amount. This appears to afford a greater degree of agitation of the reaction solutions and to ensure production of a calcium silicate having the desired particle size. Further, it is desirable to adjust the concentration of silicate and calcium chloride in the solutions so that calcium silicate will be prepared in a concentration approximately equal to about 5 to 250 grams of calcium silicate per liter of solution or slurry. Moreover, in order to ensure production of a calcium silicate having an extremely small particle size, an alkali metal silicate having the composition $Na_2O(SiO_2)_x$ where $x$ is a number not less than 2 nor more than 4, is preferably used. This results in the production of a calcium silicate having the composition $CaO(SiO_2)_x$ where $x$ is a number not less than 2 nor more than about 5. However, other calcium silicates, including mixed silicates of calcium and other metals such as sodium, potassium, and/or aluminum, where $x$ is higher or lower than this range, may be used according to the above described methods if desired.

Other silicates which may be used in lieu of calcium silicate are the corresponding barium, strontium, and magnesium silicates. These materials may be prepared by reacting the corresponding metal chloride with sodium silicate according to the method discussed above. Moreover, calcium silicate may be reacted with the corresponding metal chloride of these metals and the resulting silicate reacted with an aluminum salt as herein described.

According to a further embodiment of the invention, calcium aluminum silicate suitable for use as a pigment in the reinforcement of rubber may be prepared by reacting an alkali metal silicate with a water soluble aluminum salt in the presence of a water soluble salt of calcium or similar metal of group II, series 3 to 8 of the periodic table. Thus, the alumina-silica-calcium silicate pigment may be precipitated directly by mixing a solution of a soluble aluminum salt, such as one of the salts mentioned above, and a water soluble calcium salt, with an aqueous solution of an alkali metal silicate, such as sodium silicate, preferably a silicate in which the $SiO_2$ to $Na_2O$ mole ratio is not less than 2. The mole ratio of calcium to aluminum salt initially provided may be varied from about 0.25 to 20 moles of aluminum per mole of calcium. This mixing is effected under conditions of vigorous agitation, and a typical method of effecting the reaction is the one described above with reference to the precipitation of calcium silicate. This process results in formation of the pigment in the desired finely divided state. Typical aluminum salts which may be used are aluminum chloride, aluminum nitrate, aluminum acetate, aluminum sulphate, and the like. Typical calcium or like salts useful in this embodiment are calcium, magnesium or barium chlorides, magnesium sulphate or the corresponding nitrates.

The mole ratio of $Al_2O_3$ to $SiO_2$ in the pigment herein contemplated depends to a substantial degree upon the composition of the calcium silicate treated. Thus, in the case of aluminum sulphate, the reaction with calcium silicate is in the proportion of one mole of aluminum sulphate per three moles of calcium silicate. Thus, the product produced is approximately $Al_2O_3(SiO_2)_{3x}$ where $x$ is the initial ratio of $SiO_2$ to $CaO$ in the calcium silicate. Hence, when $CaO(SiO_2)_{3.3}$ is treated, the product corresponds roughly to the formula, $Al_2O_3 9.9SiO_2$, and, in treating calcium silicate having the composition $CaO(SiO_2)_x$ where $x$ is 2 to 5, the product corresponds to the formula, $Al_2O_3(SiO_2)_{3x}$ where $3x$ is 6 to 15.

By pretreating the calcium silicate with hydrochloric acid or like acid, it is possible to increase the ratio of $SiO_2$ to $CaO$ above 5. In such a case, the products produced by reacting such acid-treated calcium silicate with an aluminum salt will contain much higher ratios of $SiO_2$ to $Al_2O_3$. Moreover, finely divided silica precipitated in aqueous medium can be treated with aluminum sulphate or like aluminum salt to produce an alumina-silica pigment.

The alumina-silica pigments containing 6 to 40 moles of $SiO_2$ are highly effective paper pigments and have good opacifying properties in paper. They are also useful in rubber compositions where abrasion resistance is valuable, such as in shoe soles.

In accordance with a further embodiment of the invention, the pigment which is produced may be treated with a coating agent in order to improve certain of its properties. As an example, the pigment may be treated with coating agents, such as non-drying oils, for example, cocoanut oil, corn oil, lard, lard oil, sperm oil or tallow, and other coating agents, such as oleic acid, stearic acid, tall oil acids, and similar non-drying acids, or the alkali metal or ammonium soaps of these acids. The coating agent may be incorporated simply by forming an aqueous slurry of the resulting pigment and adding the coating agent thereto. After the addition, the mixture may be agitated, filtered, and dried in the usual manner.

The pigments herein contemplated having rubber reinforcing properties are used to reinforce various rubber elastomers or rubber compositions, including natural rubber compositions, synthetic rubber compositions, such as butadiene-styrene copolymers known as "GR–S" rubber, butadiene-acrylonitrile polymers, chloroprene rubber, butyl rubber, and like polymers of butadiene-1,3, isoprene, 2-chlorobutadiene-1,3, and 2,3-dimethyl butadiene-1,3, and copolymers thereof with styrene, acrylonitrile, and the like, as well as polyvinyl chloride, vinyl chloride-vinyl acetate copolymers, etc., and mixtures of natural and synthetic rubbers. The reinforced compositions produced exhibit superior qualities over those obtained where calcium silicate was used. The amount of such pigment incorporated in these rubber or elastomer compositions generally is about 10 to 100 parts by weight per 100 parts by weight of elastomer or rubber composition.

The invention may be more fully understood by reference to the following examples:

EXAMPLE I

An aqueous slurry of finely divided calcium silicate was prepared by introducing a stream of a solution of aqueous sodium silicate containing 10 grams of $SiO_2$ as $Na_2O.(SiO_2)_{3.36}$ per liter of solution and a stream of aqueous calcium chloride containing 10 grams of $CaCl_2$ per liter into a centrifugal pump, as described above. Sufficient calcium chloride was used to ensure an excess of at least 10 percent of calcium chloride over the theoretical amount required to react with the sodium silicate. The calcium silicate thus produced had an average ultimate particle size of about 0.03 to 0.05 micron.

This material was washed and thickened and then mixed with an aqueous solution of aluminum chloride in an amount sufficient to provide 20 percent excess aluminum chloride over the stoichiometric amount required to react with all of the CaO in the calcium silicate. The mixture was held at a temperature of 160° F. for 2 hours. The excess chloride was then washed out and the remaining material was filtered on Buchner funnels, dried at 220° F., and pulverized. The chemical analysis of the aluminum silicate thus prepared was as follows:

| | Percent |
|---|---|
| $SiO_2$ | 69.5 |
| $Al_2O_3$ | 13.9 |
| $Fe_2O_3$ | 0.88 |
| CaO | 2.1 |
| NaCl | 0.2 |
| Ignition losses | 13.0 |
| $H_2O$ | 3.6 |

The pulverized material was compounded in GR-S rubber, using standard compounding procedures, according to the following recipe:

| | Parts by weight |
|---|---|
| GR-S | 100.0 |
| Zinc oxide | 5.0 |
| Sulphur | 4.0 |
| Santocure | 1.75 |
| Picco 100 | 10.0 |
| Agerite powder | 1.0 |
| Aluminum silicate | 82.8 |

The resulting compounds were milled into two separate sheets and cured for varying lengths of time at a temperature of 280° F. The rubber compound obtained by using the aluminum silicate pigment had tensile and tear strengths higher than those obtained using calcium silicate as a reinforcing pigment.

The compositions listed in the above formulations by trade name have chemical compositions as follows:

"Santocure" _____ N - cyclohexyl-2-benzothiazolsulfonamide.
"Picco 100" _____ Para cumarone-indene resin having a melting point of about 110 to 127° C.
"Agerite powder" _____ Phenyl beta-naphthylamine.

EXAMPLE II

A stream of an aqueous solution of sodium silicate containing 100 grams of $SiO_2$ per liter as $Na_2O(SiO_2)_{3.36}$ and a stream of calcium chloride containing 100 grams per liter of solution were introduced into a centrifugal pump impeller, as described above, while proportioning the calcium chloride so that it remained at least 10 percent in excess. The slurry was washed to removed dissolved chloride. Samples of this slurry were reacted with aluminum chloride solution in amounts equal to 10 percent, 30 percent, 50 percent, 75 percent, and 100 percent of the theoretical amount required to react with all of the CaO in the calcium silicate. In these tests, the aluminum chloride was mixed in solution with the slurry and the mixture was allowed to stand for 4 hours at 160° F. The materials thus obtained had the following compositions:

Table 1

| Sample No. | Percent by weight | | | | Amount of $AlCl_3$ added percent of Stoichiometric |
|---|---|---|---|---|---|
| | Ignition loss (bound and free water) | $SiO_2$ | $Al_2O_3$ | CaO | |
| 1 | 20.93 | 58.92 | 0.40 | 18.03 | None |
| 2 | 25.75 | 51.55 | 2.99 | 17.72 | 10 |
| 3 | 23.38 | 57.43 | 4.91 | 13.29 | 30 |
| 4 | 22.34 | 60.03 | 5.63 | 9.83 | 50 |
| 5 | 22.26 | 60.17 | 7.80 | 9.08 | 75 |
| 6 | 19.38 | 64.01 | 13.96 | 2.44 | 100 |

EXAMPLE III

An aqueous slurry containing 10 pounds of finely divided calcium silicate having an average ultimate particle size of about 0.05 micron, as determined by an electron microscope, and having the composition $$CaO.(SiO_2)_{3.36}$$

was thoroughly mixed with 4.44 pounds of aluminum sulphate in an agitating tank. After thorough mixing, the slurry was filtered and dried in a tray-type dryer, at a temperature of 100 to 125° C. The resulting aluminum silicate was a very fine white powder suitable for rubber compounding.

EXAMPLE IV

An aqueous slurry containing 100 grams per liter of finely divided calcium silicate having the composition $CaO(SiO_2)_{3.3}$ was prepared by mixing continuously flowing streams of sodium silicate and calcium chloride, each containing 100 grams per liter of reactant, in a pump as described above. The resulting slurry was titrated with an aqueous solution containing 10 percent by weight of aluminum sulphate to a greenish yellow color using bromothymol blue as the indicator. The pH of such a slurry is about 7. During the titration, the temperature was maintained at 180° F. and the mixture was thoroughly agitated. Thereafter, the resulting product was filtered, washed with hot water, and dried at a temperature of about 100 to 125° C. The dry product was milled. The resulting product was found to be a fine, very white powder which, when dispersed in water, gave a slurry having a pH of about 5.7.

EXAMPLE V

The process of Example IV was repeated except that the titration with aluminum sulphate was effected at 75° F. The resulting product, when dispersed in water, gave a slurry which had a pH of 7.

EXAMPLE VI

A slurry was prepared containing 5 grams of finely divided calcium silicate having the composition $$CaO(SiO_2)_{3.3}$$

and was dried at 100 to 130° C. to the point where it contained about 5 percent by weight of bound water and about 5 percent by weight of free water, in 95 grams of water. To this slurry were added portions of 0.5 molar aluminum sulphate solution and, after each addition, the slurry was agitated at room temperature for about 5 minutes. Thereupon, the pH of the slurry was measured. The results were as follows:

*Table II*

| Grams of aluminum sulphate $Al_2(SO_4)_3$ added | pH of Resulting slurry |
| --- | --- |
| 0.00 | 10.18 |
| 0.352 | 8.40 |
| 0.528 | 8.23 |
| 0.704 | 8.02 |
| 0.880 | 7.88 |
| 1.056 | 7.80 |
| 1.408 | 7.30 |
| 1.760 | 5.75 |
| 2.112 | 4.10 |
| 2.464 | 3.88 |
| 2.816 | 3.65 |
| 3.168 | 3.60 |
| 3.520 | 3.55 |
| 3.872 | 3.53 |
| 4.576 | 3.50 |
| 5.280 | 3.45 |
| 6.512 | 3.40 |

According to a further embodiment of this invention, the calcium silicate may be reacted with an aluminum salt and an acid. If the acid forms a water soluble calcium salt, the process produces a mixture of silica and aluminum silicate. Thus, $CaO(SiO_2)_{3.36}$ may be reacted with hydrochloric or like acid to extract one-fourth to one-half of the calcium therefrom and the resulting product reacted with aluminum chloride as described in Examples I and II, or with aluminum sulphate as described in Example III. These products have higher $SiO_2$ to $Al_2O_3$ molecular ratios, ranging as high as 7 or above, depending upon the amount of acid used.

Acids which form water insoluble salts of the calcium or like metal may be used. Thus, sulphuric or sulphurous acids may be added to react with up to 50 percent of the calcium silicate, and the resulting product treated as in Example I, II, III or IV. Alternatively, the product obtained by reacting calcium silicate with 10, 30 or 50 percent of the theoretical amount of aluminum chloride, as described in Example II, may be further neutralized to pH 7 with sulphuric, sulphurous or like acids which form a water insoluble calcium salt. Products produced by this means comprise of silica and aluminum in admixture with calcium salt of the acid used for the neutralization.

The above description has been directed primarily to embodiments of the invention wherein the calcium silicate is prepared by continuous mixing of flowing streams of sodium silicate and calcium chloride, and the calcium silicate has the composition $CaO(SiO_2)_x$, where $x$ is about 2 to 4. Such calcium silicate is especially useful for production of a rubber pigment according to this invention.

As explained above, a pigment having a larger particle size is desired for paper. This can be prepared by treatment of calcium silicate of somewhat lower surface area (5 to 50 square meters per gram) and a larger ultimate particle size (greater than 0.05 micron). Such calcium silicate may be produced by a batch process in which the sodium silicate is added to a pool of calcium chloride solution or vice versa, under conditions such that the degree of agitation of the pool is low.

The aluminum silicates prepared according to this invention are finely divided, soft, pulverulent, amorphous products. The composition of such silicates is $$Al_2O_3 \cdot (SiO_2)_y$$

where $y$ is 6 but less than 40, including fractional numbers. The silicates may contain substantial amounts of metals other than aluminum. Thus, a pigment having the following composition is suitable:

| | Percent by weight |
| --- | --- |
| Ignition loss at 1000° C | 16.7 |
| Loss on drying at 105° C | 5.4 |
| $SiO_2$ | 46.1 |
| $R_2O_3$ (almost entirely $Al_2O_3$) | 10.88 |
| $Fe_2O_3$ | 0.24 |
| CaO | 11.82 |
| MgO | 0.38 |
| $Na_2O$ | 10.04 |
| Chloride | 0.04 |
| $SO_3$ | 3.8 |
| $CO_2$ | 6.6 |

As shown above, the products may be, and frequently are, mixed with other salts such as calcium sulphate and the like. Quite often they also contain other metals such as calcium, zinc, barium, and the like, the presence of which are advantageous in order to maintain the basicity of the pigment. They are invariably amorphous.

The products normally contain 2 to 10 percent by weight of free water (water which can be driven off by heating at 105° C. for 24 hours) and 2 to 10 percent by weight of bound water, i.e., the water which is driven off upon heating to 1000 to 2000° C. minus the free water.

The alumina-silica pigment herein contemplated may be used in paper as a pigment advantageously in lieu of titanium dioxide. It is especially advantageous to precipitate the pigment in situ in the paper pulp slurry.

The following examples are illustrative:

EXAMPLE VII

Finely divided calcium silicate slurry prepared as in Example II was reacted with aluminum sulphate solution to a slurry pH of 4.8. The resulting product was filtered and washed free of chloride and then dried at 105° C. This product had a surface area of 104 square meters per gram.

The resulting product was ground to break up agglomerates and was slurried in water to produce a slurry containing 5 percent by weight of the aluminum silicate. Bleached kraft pulp was beaten to 400 cc. of freeness. A portion of this pulp slurry containing 1.5 percent by weight of pulp (on a dry basis) was mixed with the aluminum silicate slurry in the proportion of 10 parts by weight of the aluminum silicate per 100 parts by weight of pulp (dry basis). The mixture was thoroughly stirred for 3 minutes and the resulting slurry was treated to sheet, using a noble wood laboratory sheet machine. The resulting sheets were tested and compared to similarly prepared sheets without pigment, with the following results:

*Table III*

| | Ash, percent by weight | Opacity, percent | Brightness, percent |
| --- | --- | --- | --- |
| Sheets with aluminum silicate | 6.9 | 77.8 | 81.2 |
| Sheets without pigment | 0.3 | 62.1 | 77.0 |

EXAMPLE VIII

A pulp beater was charged as follows:

| | Grams |
| --- | --- |
| Unbleached sulphite pulp | 90 |
| Bleached kraft pulp | 180 |
| Hard white envelope cuttings | 90 |

This charge was dispersed in 23 liters of water and the resulting slurry was beaten in a Niagara beater for about 80 minutes to approximately 400 milliliters freeness, Canadian standard (TAPPI standard T227m50). One hundred milliliters of prepared rosin of about 5 percent by weight size was then added. Thereafter, 9 grams of pregelatinized starch was added and the pulp was circulated in the beater long enough to ensure complete mixing. Aluminum sulphate in the amount of 3 percent by weight, based on the dry weight of pulp, was added as a solution containing 12.92 grams of aluminum sulphate octodecahydrate per liter. At this stage, the pulp consistency was approximately 1.1 percent. Stirring was continued for 2 minutes. Immediately thereafter, the amounts of calcium silicate having the composition $CaO(SiO_2)_{3.3}$ and titanium dioxide indicated in the table were added. The amounts are expressed as percentages of the dry weight of the pulp. Stirring of the mixture was continued for 10 minutes more and the resulting stock was diluted to 8,000 milliliters, divided into ten 800 milliliter portions, and sheeted into paper. The paper was tested for brightness, opacity, bursting strength, weight and thickness, and ash and moisture content, with the following results:

Table IV

| Sample Nos. | 1 | 2 | 3 | 4 | 5 | 6 |
|---|---|---|---|---|---|---|
| Percent titanium dioxide by weight | 1.0 | 0.5 | None | 1.5 | None | None |
| Percent calcium silicate by weight | 1.0 | 2.5 | 4.0 | None | 4.0 | None |
| Brightness: | | | | | | |
| Green light | 70.8 | 70.0 | 72.9 | 73.2 | 72.2 | 70.5 |
| Blue light | 61.2 | 62.2 | 63.3 | 63.4 | 63.1 | 59.3 |
| Contrast ratio (green light): | | | | | | |
| Reflectance, black backing | 56.9 | 57.0 | 57.0 | 57.9 | 57.3 | 53.0 |
| Reflectance, white backing | 79.0 | 80.1 | 81.1 | 80.6 | 79.7 | 79.6 |
| Ratio | 72.1 | 71.2 | 70.3 | 71.8 | 71.9 | 66.6 |
| Contrast ratio (blue light): | | | | | | |
| Reflectance, black backing | 53.7 | 53.9 | 54.5 | 54.9 | 54.7 | 49.9 |
| Reflectance, white backing | 66.8 | 67.9 | 69.3 | 68.6 | 68.3 | 66.9 |
| Ratio | 76.2 | 75.3 | 74.5 | 75.9 | 76.0 | 70.6 |
| Bursting strength, lb./in.² | 32.0 | 34.5 | 33.0 | 33.6 | 35.0 | 35.0 |
| Percent ash in oven dry paper | 2.23 | 2.63 | 2.83 | 1.86 | 2.84 | 1.28 |

Comparison of paper pigmented with the calcium silicate-aluminum sulphate product of this invention (samples 3 and 5) with paper pigmented with titanium dioxide (sample 4) shows that about the same brightness and opacity is imparted by both pigments, and that both papers have about the same bursting strength. Hence, the relatively expensive titanium dioxide may be replaced with a reaction product of this invention at considerable saving in cost and without diminution of physical properties such as strength, brightness or opacity. Titanium dioxide may be used in the present process as in samples 1 and 2.

Although the present invention has been described with reference to the specific details of certain embodiments thereof, such details should not be regarded as limitations upon the scope of the invention except insofar as included in the accompanying claims.

This application is a continuation-in-part of applications Serial No. 806,212, filed April 14, 1959, and Serial No. 616,595, filed October 18, 1956, now abandoned, which application was a continuation-in-part of applications Serial No. 770,169, filed August 22, 1947; Serial No. 277,760, filed March 21, 1952, now abandoned; Serial No. 283,721, filed April 22, 1952, now United States Letters Patent 2,805,955; Serial No. 355,865, filed May 18, 1953, now United States Letters Patent 2,786,777; and Serial No. 473,057, filed December 3, 1954, now United States Letters Patent 2,786,776.

I claim:

1. Finely divided, precipitated, white alumina-silica pigment in the form of flocs of ultimate particles and having at least 6 but less than 40 moles of $SiO_2$ per mole of $Al_2O_3$, said pigment having an average ultimate particle size below 0.1 micron and containing up to but not in excess of 10 percent by weight of free water.

2. Finely divided, precipitated, white alumina-silica pigment in the form of flocs of ultimate particles and having at least 6 but less than 40 moles of $SiO_2$ per mole of $Al_2O_3$, said pigment having an average ultimate particle size of 0.01 to 0.05 micron and containing up to but not in excess of 10 percent by weight of free water.

3. Finely divided, precipitated, white alumina-silica pigment in the form of flocs of ultimate particles and having at least 6 but less than 40 moles of $SiO_2$ per mole of $Al_2O_3$, said pigment having an average ultimate particle size of 0.05 to 0.1 micron.

4. Finely divided, amorphous alumina-silica pigment in the form of flocs of ultimate particles and having at least 6 but less than 40 moles of $SiO_2$ per mole of $Al_2O_3$, the mole ratio of $SiO_2$ to all metal oxides in the pigment being in excess of 2 and the mole ratio of $Al_2O_3$ to the sum of the other metal oxides being above 0.2; said pigment having an average ultimate particle size of 0.01 to 0.05 micron and containing up to but not in excess of 10 percent by weight of free water.

5. Finely divided, white alumina-silica pigment in the form of flocs of ultimate particles and having at least 6 but less than 40 moles of $SiO_2$ per mole of $Al_2O_3$, said pigment having an average ultimate particle size below 0.1 micron.

6. Finely divided, precipitated, white alumina-silica pigment in the form of flocs of ultimate particles and having 6 to 15 moles of $SiO_2$ per mole of $Al_2O_3$, said pigment having an average ultimate particle size below 0.1 micron.

7. Finely divided, amorphous, precipitated alumina-silica pigment in the form of flocs of ultimate particles and having 6 to 15 moles of $SiO_2$ per mole of $Al_2O_3$, the mole ratio of $SiO_2$ to all metal oxides in the pigment being in the excess of 2 and the mole ratio of $Al_2O_3$ to the sum of the other metal oxides being above 0.2, said pigment having an average ultimate particle size of less than 0.1 micron.

8. Finely divided, precipitated, white alumina-silica pigment in the form of flocs of ultimate particles and having 6 to 15 moles of $SiO_2$ per mole of $Al_2O_3$, said pigment having an average ultimate particle size of 0.01 to 0.05 micron and containing up to but not in excess of 10 percent by weight of free water.

References Cited in the file of this patent

UNITED STATES PATENTS

| 2,739,073 | Bertorelli | Mar. 20, 1956 |
| 2,848,346 | Bertorelli | Aug. 19, 1958 |

FOREIGN PATENTS

| 805,494 | Great Britain | Dec. 10, 1958 |
| 571,163 | Canada | Feb. 24, 1959 |